(12) United States Patent
Chatterji et al.

(10) Patent No.: US 6,708,760 B1
(45) Date of Patent: Mar. 23, 2004

(54) METHODS AND CEMENT COMPOSITIONS FOR CEMENTING IN SUBTERRANEAN ZONES

(75) Inventors: Jiten Chatterji, Duncan, OK (US); Roger S. Cromwell, Walters, OK (US); Darrell C. Brenneis, Marlow, OK (US); Bobby J. King, Duncan, OK (US)

(73) Assignee: Halliburton Energy Services, Inc., Duncan, OK (US)

( * ) Notice: Subject to any disclaimer, the term of this patent is extended or adjusted under 35 U.S.C. 154(b) by 110 days.

(21) Appl. No.: 10/299,294

(22) Filed: Nov. 19, 2002

(51) Int. Cl.$^7$ ............................................. E21B 33/13
(52) U.S. Cl. ...................... 166/294; 166/283; 106/726; 106/730; 106/805
(58) Field of Search ................. 166/294, 292, 166/285, 309, 282, 283; 106/726, 730, 805

(56) References Cited

U.S. PATENT DOCUMENTS

| | | | |
|---|---|---|---|
| 2,555,446 A | 6/1951 | Hutchinson | 260/232 |
| 2,852,402 A | 9/1958 | Shell | 106/93 |
| 2,961,044 A | 11/1960 | Shella | 166/21 |
| 2,985,239 A | 5/1961 | Shell | 166/31 |
| 3,959,003 A | 5/1976 | Ostroot et al. | 106/93 |
| 4,038,093 A | 7/1977 | Brooks, Jr. | 106/93 |
| 4,069,869 A * | 1/1978 | Sandiford | 166/270 |
| 4,190,110 A | 2/1980 | Beirute | 166/291 |
| 4,239,629 A | 12/1980 | Sauber | 252/8.5 C |
| 4,283,229 A * | 8/1981 | Girg et al. | 106/181.1 |
| 4,433,731 A * | 2/1984 | Chatterji et al. | 166/293 |
| 4,554,081 A | 11/1985 | Borchardt et al. | 252/8.5 A |
| 4,557,763 A | 12/1985 | George et al. | 106/90 |
| 4,582,139 A | 4/1986 | Childs et al. | 166/293 |
| 4,601,758 A | 7/1986 | Nelson | 106/90 |
| 4,640,942 A | 2/1987 | Brothers | 523/130 |
| 4,676,317 A | 6/1987 | Fry et al. | 166/293 |
| 4,687,516 A | 8/1987 | Burkhalter et al. | 106/90 |
| 4,703,801 A | 11/1987 | Fry et al. | 166/293 |
| 4,707,187 A * | 11/1987 | Tsuda et al. | 106/93 |
| 4,926,944 A | 5/1990 | Schilling | 166/293 |
| 4,990,191 A | 2/1991 | Schilling | 106/805 |
| 5,012,870 A | 5/1991 | Schilling | 166/293 |
| 5,016,711 A | 5/1991 | Cowan | 166/250 |
| 5,020,598 A | 6/1991 | Cowan et al. | 166/293 |
| 5,135,577 A | 8/1992 | Brothers | 106/724 |
| 5,151,131 A | 9/1992 | Burkhalter et al. | 106/822 |
| 5,191,931 A | 3/1993 | Himes et al. | 166/282 |
| 5,298,070 A | 3/1994 | Cowan | 106/724 |
| 5,325,922 A | 7/1994 | Cowan et al. | 166/293 |
| 5,368,642 A | 11/1994 | Rodrigues et al. | 106/727 |
| 5,447,197 A | 9/1995 | Rae et al. | 166/293 |
| 5,547,506 A | 8/1996 | Rae et al. | 106/730 |
| 5,558,161 A | 9/1996 | Vitthal et al. | 166/280 |
| 5,996,694 A | 12/1999 | Dewprashad et al. | 166/294 |
| 6,110,271 A | 8/2000 | Skaggs et al. | 106/804 |
| 6,145,591 A | 11/2000 | Boncan et al. | 166/291 |
| 6,173,778 B1 | 1/2001 | Rae et al. | 166/293 |
| 6,182,758 B1 | 2/2001 | Vijn | 166/293 |
| 6,230,804 B1 | 5/2001 | Mueller et al. | 166/293 |
| 6,405,801 B1 | 6/2002 | Vijn et al. | 166/293 |

* cited by examiner

Primary Examiner—Zakiya Walker
(74) Attorney, Agent, or Firm—Craig W. Roddy; C. Clark Dougherty, Jr.

(57) ABSTRACT

Methods of cementing in subterranean zones, improved cement compositions and improved additives are provided. The compositions are basically comprised of a hydraulic cement, sufficient water to form a slurry and an additive for providing improved rheology, fluid loss control and set retardation comprised of carboxymethylhydroxyethylcellulose having in the range of from about 0.62 to about 2.21 moles of hydroxyethyl substitution and in the range of from about 0.44 to about 0.52 degrees of carboxymethyl substitution and a 2% by weight aqueous solution of the carboxymethylhydroxyethylcellulose has a Höppler viscosity in the range of from about 55 mPa.s to about 359 mPa.s.

18 Claims, No Drawings ized for cementing in subterranean zones penetrated by well bores must have good rheological properties, low fluid losses and sufficient set retardation at high temperatures. In addition, the cement compositions must have adequate thickening times and compressive strengths. Heretofore, carboxymethylhydroxyethylcellulose (CMHEC) has been used in foamed and non-foamed cement compositions to control fluid loss and provide set retardation to the cement compositions. While CMHEC has been used successfully as an additive in cement compositions used for cementing subterranean zones, there are continuing needs for improved cementing methods, cement compositions and cement additives for providing improved rheologies, viscosities, fluid loss control properties, thickening times and compressive strengths to cement compositions placed in subterranean zones.

SUMMARY OF THE INVENTION

The present invention provides improved methods, cement compositions and additives for cementing subterranean zones penetrated by well bores which meet the needs described above and overcome the deficiencies of the prior art. The improved methods of this invention are basically comprised of the following steps. A cement composition is prepared or provided comprised of a hydraulic cement, sufficient water to form a slurry and an additive for providing improved rheology, fluid loss control and set retardation to the cement composition comprised of carboxymethylhydroxyethylcellulose having in the range of from about 0.62 to about 2.21 moles of hydroxyethyl substitution and in the range of from about 0.44 to about 0.52 degrees of carboxymethyl substitution, and a 2% by weight aqueous solution of the carboxymethylhydroxyethylcellulose has a Höppler viscosity in the range of from about 55 mPa.s to about 359 mPa.s. Thereafter, the cement composition is placed in a subterranean zone and allowed to set into a solid mass therein.

An improved cement composition for cementing in a subterranean zone is also provided by this invention. The improved cement composition is comprised of a hydraulic cement, sufficient water to form a slurry and an additive for providing improved rheology, fluid loss control and set retardation to the cement composition comprised of carboxymethylhydroxyethylcellulose having in the range of from about 0.62 to about 2.21 moles of hydroxyethyl substitution, and in the range of from about 0.44 to about 0.52 degrees of carboxymethyl substitution and a 2% by weight aqueous solution of the carboxymethylhydroxyethylcellulose has a Höppler viscosity in the range of from about 55 mPa.s to about 359 mPa.s.

An improved cement composition additive for providing improved rheology, fluid loss control and set retardation to a cement composition is comprised of carboxymethylhydroxyethylcellulose having in the range of from about 0.62 to about 2.21 moles of hydroxyethyl substitution and in the range of from about 0.44 to about 0.52 degrees of carboxymethyl substitution, and a 2% by weight aqueous solution of the carboxymethylhydroxyethylcellulose has a Höppler viscosity in the range of from about 55 mPa.s to about 359 mPa.s.

The objects, features and advantages of the present invention will be readily apparent to those skilled in the art upon a reading of the description of preferred embodiments which follows.

DESCRIPTION OF PREFERRED EMBODIMENTS

As mentioned above, carboxymethylhydroxyethylcellulose (hereinafter referred to as CMHEC) has heretofore been used as a set retarder and fluid loss control additive in foamed and non-foamed cement compositions. While the use of CMHEC has improved the rheology of the prior cement compositions and provided some fluid loss control and set retardation properties thereto, improved such properties are needed particularly in subterranean zones having temperatures in the range of from about 110° F. to about 220° F.

It has been discovered that CMHEC with a particular ethylene oxide substitution and a particular carboxymethyl substitution provides a much improved additive for foamed and non-foamed cement compositions. That is, the foamed and non-foamed cement compositions of the present invention which include CMHEC having in the range of from about 0.62 to about 2.21 moles of hydroxyethyl substitution and in the range of from about 0.44 to about 0.52 degrees of carboxymethyl substitution have enhanced properties as compared to prior CMHEC additives. That is, the cement compositions of this invention have superior rheology, fluid loss control properties, thickening times and compressive strengths as compared to the prior art cement compositions.

An improved method of this invention is comprised of the following steps. A cement composition is prepared or provided comprised of a hydraulic cement, sufficient water to form a slurry and an additive for providing improved rheology, fluid loss control and set retardation to the cement composition comprised CMHEC having in the range of from about 0.62 to about 2.21 moles of hydroxyethyl substitution and in the range of from about 0.44 to about 0.52 degrees of carboxymethyl substitution, and a 2% by weight aqueous solution of the CMHEC has a Höppler viscosity in the range of from about 55 mPa.s to about 359 mPa.s.

An improved cement composition of this invention is comprised of a hydraulic cement, sufficient water to form a slurry and an additive for providing improved rheology, fluid loss control and set retardation to the cement composition comprised of CMHEC having in the range of from about 0.62 to about 2.21 moles of hydroxyethyl substitution and in the range of from about 0.44 to about 0.52 degrees of carboxymethyl substitution, and a 2% by weight aqueous solution of the CMHEC has a Höppler viscosity in the range of from about 55 mPa.s to about 359 mPa.s. The CMHEC of this invention is present in the cement composition in an amount in the range of from about 0.1% to about 2.5% by weight of the hydraulic cement therein.

The Höppler viscosity measurement in units of milliPascal.seconds (mPa.s) is determined using a Falling Ball Viscometer. In the use of such a viscometer, a fluid sample (the viscosity of which is to be measured) is placed in a tilted glass measuring tube surrounded by a jacket to allow accurate temperature control by means of a constant temperature circulator. The tube is positioned at a 10° inclination with respect to the vertical. The tube has two ring marks spaced apart by 100 millimeters. A ball is allowed to fall through the fluid sample. Falling from a starting position at the top of the tube, the ball accelerates along a distance to reach a steady-state speed providing a uniform shear flow of the liquid in a sickle shape gap in the tube surrounding the ball. The time for the ball to pass between the ring marks on the tube is measured. The time is then used to calculate viscosity in the absolute units of mPa.s.

The hydraulic cement in the cement composition is selected from the group consisting of Portland cements, slag cements, pozzolana cements, gypsum cements, alumina cements and alkaline cements. Of these, Portland cement is preferred.

The water in the cement composition is selected from the group consisting of fresh water and salt water. The term "salt water" is used herein to mean unsaturated salt solutions and saturated salt solutions including brines and seawater. The water is present in the cement composition in an amount in the range of from about 35% to about 55% by weight of hydraulic cement therein.

A foamed cement composition of this invention is comprised of a hydraulic cement, sufficient water to form a slurry and a CMHEC additive of this invention as described above. In addition, the foamed cement composition includes sufficient gas therein to foam the cement slurry and a sufficient amount of a foaming and foam stabilizing surfactant mixture to facilitate the formation of and stabilize the foam. As mentioned above in connection with the non-foamed cement composition, various cements can be utilized with Portland cement being preferred. The water in the cement composition can be fresh water or salt water and is present in the foamed composition in an amount in the range of from about 35% to about 55% by weight of hydraulic cement therein.

The gas in the foamed cement composition can be air or nitrogen, with nitrogen being preferred.

A particularly suitable and preferred mixture of foaming and foam stabilizing surfactants for use in accordance with this invention is comprised of an ethoxylated alcohol ether sulfate surfactant of the formula $H(CH_2)_a(OC_2H_4)_bOSO_3NH_4^+$ wherein a is an integer in the range of from about 6 to about 10 and b is an integer in the range of from about 3 to about 10; an alkyl or alkene amidopropylbetaine surfactant having the formula $R-CONHCH_2CH_2CH_2N^+(CH_3)_2CH_2CO_2^-$ wherein R is a radical selected from the group of decyl, cocoyl, lauryl, acetyl and oleyl; and an alkyl or alkene amidopropyldimethylamine oxide surfactant having the formula $R-CONHCH_2CH_2CH_2N^+(CH_3)_2O^-$ wherein R is a radical selected from the group of decyl, cocoyl, lauryl, acetyl and oleyl. The ethoxylated alcohol ether sulfate surfactant is generally present in the additive in an amount in the range of from about 60 to about 64 parts by weight, and more preferably in an amount of about 63.3 parts by weight. The alkyl or alkene amidopropylbetaine surfactant is generally present in the additive in an amount in the range of from about 30 to about 33 parts by weight, and more preferably in an amount of 31.7 parts by weight. The alkyl or alkene amidopropyldimethylamine oxide surfactant is generally present in the additive in an amount in the range of from about 3 to about 10 parts by weight, and more preferably in an amount of about 5 parts by weight. The additive can be in the form of a mixture of the above described surfactants, but more preferably, the additive includes fresh water in an amount sufficient to dissolve the surfactants to more easily be combined with the cement composition. The mixture of foaming and foam stabilizing surfactants is generally included in the cement composition in an amount in the range of from about 0.8% to about 5% by volume of water in the composition, and more preferably in an amount of about 2%.

The improved cement composition additives of this invention for providing improved rheology, fluid loss control and set retardation to cement compositions are generally comprised of CMHEC having in the range of from about 0.62 to about 2.21 moles of hydroxyethyl substitution and in the range of from about 0.44 to about 0.52 degrees of carboxymethyl substitution, and a 2% by weight aqueous solution of the CMHEC has a Höppler viscosity in the range of from about 55 mPa.s to about 359 mPa.s.

A particularly preferred additive of this invention for providing improved rheology, fluid loss control and set retardation to foamed or non-foamed cement compositions useful in cementing subterranean zones is comprised of CMHEC having about 1.93 moles of hydroxyethyl substitution and about 0.52 degrees of carboxymethyl substitution, and a 2% by weight aqueous solution of the CMHEC has a Höppler viscosity of about 55 mPa.s.

A preferred method of this invention for cementing a subterranean zone is comprised of the steps of: (a) providing or preparing a cement composition comprised of a hydraulic cement, sufficient water to form a slurry and an additive for providing improved rheology, fluid loss control and set retardation to the cement composition comprised of CMHEC having in the range of from about 0.62 to about 2.21 moles of hydroxyethyl substitution and in the range of from about 0.44 to about 0.52 degrees of carboxymethyl substitution, and a 2% by weight aqueous solution of the CMHEC has a Höppler viscosity in the range of from about 55 mPa.s to about 359 mPa.s; (b) placing the cement composition in the subterranean zone; and (c) allowing the cement composition to set into a solid mass therein.

Another preferred method of this invention for cementing a subterranean zone is comprised of the steps of: (a) providing a foamed cement composition comprised of Portland cement, sufficient water to form a slurry, an additive for providing improved rheology, fluid loss control and set retardation to the cement composition comprised of CMHEC having in the range of from about 0.62 to about 2.21 moles of hydroxyethyl substitution and in the range of from about 0.44 to about 0.52 degrees of carboxymethyl substitution and a 2% by weight aqueous solution of the CMHEC has a Höppler viscosity in the range of from about 55 mPa.s to about 359 mPa.s, sufficient gas to foam the slurry and a sufficient amount of a foaming and foam stabilizing surfactant mixture to facilitate the formation of and stabilize the foam; (b) placing the cement composition in the subterranean zone; and (c) allowing the cement composition to set into a solid mass therein.

An improved cement composition of this invention for cementing in a subterranean zone is comprised of: a hydraulic cement; sufficient water to form a slurry; and an additive for providing improved rheology, fluid loss control and set retardation to the composition comprised of CMHEC having in the range of from about 0.62 to about 2.21 moles of hydroxyethyl substitution and in the range of from about 0.44 to about 0.52 degrees of carboxymethyl substitution, and a 2% by weight aqueous solution of the CMHEC has a Höppler viscosity in the range of from about 55 mPa.s to about 359 mPa.s.

An improved cement composition additive of this invention for providing improved rheology, fluid loss control and set retardation to cement compositions is generally comprised of CMHEC having in the range of from about 0.62 to about 2.21 moles of hydroxyethyl substitution and in the range of from about 0.44 to about 0.52 degrees of carboxymethyl substitution, and a 2% by weight aqueous solution of the CMHEC has a Höppler viscosity in the range of from about 55 mPa.s to about 359 mPa.s.

In order to further illustrate the methods and compositions of this invention, the following examples are given.

EXAMPLE 1

A prior art CMHEC additive utilized in cement slurries and referred to herein as CMHEC-1 has two moles of hydroxyethyl substitution and 0.4 degrees of carboxymethyl substitution.

Another prior art CMHEC additive referred to herein as CMHEC-2 has 0.7 moles of hydroxyethyl substitution and 0.3 degrees of carboxymethyl substitution.

The CMHEC additive of the present invention referred to herein as CMHEC-3 has in the range of from about 0.62 to about 2.21 moles of hydroxyethyl substitution and in the range of from about 0.44 to about 0.52 degrees of carboxymethyl substitution, and a 2% by weight solution of the CMHEC has a Höppler viscosity in the range of from about 55 mPa.s to about 359 mPa.s.

Each of the three CMHEC additives were added to various Class H Portland cement slurries formed with fresh water in various amounts. The test cement slurries were tested for viscosity at 100° F., for fluid loss at 100° F. and 190° F., for thickening time at 165° F., 190° F. and 220° F. and for 24 hour compressive strength at 215° F., 293° F. and 318° F. These tests and those described in the Examples that follow were conducted in accordance with the API Specification For Materials And Testing For Well Cements, API Specification 10, 5th Edition, dated Jul. 1, 1990 of the American Petroleum Institute. The quantities of the various CMHEC additives in the test cement compositions and the results of the tests are set forth in Table I below.

TABLE I

Comparison Of CMHEC-1, CMHEC-2 And CMHEC-3 (Present Invention)

| Test Cement Slurry No. | Amount Of Additive In Test Cement Slurry, % by wt of cement | 100° F. Howco Viscosity Int/20 min[1] | Fluid Loss, cc/30 min | Thickening Time, hr:min | | | 24 Hour Compressive Strength | |
|---|---|---|---|---|---|---|---|---|
| | | | | 165° F. | 190° F. | 220° F. | Temp., ° F. | psi |
| Class H Cement Mixed at 15.6 lb/gal | | | | | | | | |
| 1 | 0.2 CMHEC-1 | 5/5 | 363 @ 100° F. | 12:36 | | | 215 | 2270 |
| 2 | 02 CMHEC-2 | 6/7 | No Control @ 100° F. | 4:02 | | | 215 | 3630 |
| 3 | 0.2 CMHEC-3 | 5/5 | 189 @ 100° F. | 3:48 | | | 215 | 3350 |
| 4 | 0.4 CMHEC-1 | 6/5 | 50 @ 100° F. | | | 5:15 | 293 | Soft |
| 5 | 0.4 CMHEC-2 | 5/6 | 511 @ 100° F. | | | 2:50 | 293 | 2500 |
| 6 | 0.4 CMHEC-3 | 5/5 | 48 @ 100° F. | | | 3:15 | 293 | 3180 |
| Class H Cement + 35% Silica Flour Mixed at 15.9 lb/gal | | | | | | | | |
| 4 | 0.4 CMHEC-1 | | 72 @ 100° F. | | | 9:38 | 293 | Soft |
| 5 | 0.4 CMHEC-2 | | 624 @ 100° F. | | | 4:11 | 293 | 2210 |
| 6 | 0.4 CMHEC-3 | | 56 @ 100° F. | | | 3:34 | 293 | 2760 |
| Class H Cement Mixed at 15.6 lb/gal | | | | | | | | |
| 7 | 1.0 CMHEC-1 | 6/5 | 30 @ 190° F. | | 17:00+ | | 318 | 944 |
| 8 | 1.0 CMHEC-2 | 5/6 | 102 @ 190° F. | | 20:00 | | 318 | 900 |
| 9 | 1.0 CMHEC-3 | 11/5 | 22 @ 190° F. | | 9:30 | | 318 | 1011 |

TABLE I-continued

Comparison Of CMHEC-1, CMHEC-2 And CMHEC-3 (Present Invention)

| Test Cement Slurry No. | Amount Of Additive In Test Cement Slurry, % by wt of cement | 100° F. Howco Viscosity Int/20 min[1] | Fluid Loss, cc/30 min | Thickening Time, hr:min 165° F. | 190° F. | 220° F. | 24 Hour Compressive Strength Temp., ° F. | psi |
|---|---|---|---|---|---|---|---|---|
| Class H Cement Mixed at 16.5 lb/gal | | | | | | | | |
| 10 | 1.0 CMHEC-1 | 9/6 | 24 @ 190° F. | | | | | |
| 11 | 1.0 CMHEC-2 | 15/12 | 46 @ 190° F. | | | | | |
| 12 | 1.0 CMHEC-3 | 26/13 | 18 @ 190° F. | | | | | |

[1] Int/20 means initial viscosity and viscosity after 20 minutes

From Table I it can be seen that the carboxymethylhydroxyethylcellulose of this invention designated as CMHEC-3 produced superior fluid loss properties at 100° F. and 190° F. as compared to CMHEC-1 and CMHEC-2. Acceptable thickening times were obtained with all three of the test cement samples at 165° F., 190° F. and 220° F. As concerns compressive strengths, the cement composition of the present invention, i.e., CMHEC-3, produced superior compressive strengths in 24 hours at all of the various test temperatures.

EXAMPLE 2

The test cement compositions described in Example 1 above were tested for rheology at temperatures of 80° F. and 190° F. The results of these tests are set forth in Table II below.

TABLE II

Rheology Comparison Of CMHEC-1, CMHEC-2 And CMHEC-3

| Slurry No. | Amount Of Additive In Test Cement Slurry, % by wt of cement | Fann Viscometer Readings 300 RPM | 200 RPM | 100 RPM | 6 RPM | 3 RPM |
|---|---|---|---|---|---|---|
| Class H Cement Mixed at 15.6 lb/gal @ 80° F. | | | | | | |
| 1 | 0.2 CMHEC-1 | 36 | 25 | 13 | 1 | 1 |
| 2 | 0.2 CMHEC-2 | 30 | 21 | 13 | 3 | 4 |
| 3 | 0.2 CMHEC-3 | 38 | 26 | 14 | 1 | 1 |
| 4 | 0.4 CMHEC-1 | 72 | 50 | 26 | 1 | 2 |
| 5 | 0.4 CMHEC-2 | 36 | 25 | 14 | 2 | 1 |
| 6 | 0.4 CMHEC-3 | 75 | 54 | 29 | 2 | 1 |
| Class H Cement + 35% Silica Flour Mixed at 15.9 lb/gal @ 190° F. | | | | | | |
| 4 | 0.4 CMHEC-1 | 160 | 111 | 60 | 5 | 4 |
| 5 | 0.4 CMHEC-2 | 112 | 80 | 43 | 5 | 3 |
| 6 | 0.4 CMHEC-3 | 147 | 103 | 54 | 4 | 3 |
| Class H Cement Mixed at 15.6 lb/gal @ 190° F. | | | | | | |
| 7 | 1.0 CMHEC-1 | 77 | 53 | 28 | 3 | 1 |
| 8 | 1.0 CMHEC-2 | 88 | 65 | 37 | 6 | 5 |
| 9 | 1.0 CMHEC-3 | 120 | 89 | 47 | 4 | 2 |
| Class H Cement Mixed at 16.5 lb/gal @ 190° F. | | | | | | |
| 10 | 1.0 CMHEC-1 | 300+ | 300+ | 197 | 35 | 30 |
| 11 | 1.0 CMHEC-2 | 300+ | 240 | 146 | 60 | 55 |
| 12 | 1.0 CMHEC-3 | 300+ | 300+ | 212 | 18 | 10 |
| 13 | 0.6 CMHEC-1 | 132 | 92 | 50 | 6 | 4 |
| 14 | 0.6 CMHEC-2 | 190 | 139 | 90 | 50 | 44 |
| 15 | 0.6 CMHEC-3 | 200 | 152 | 88 | 18 | 13 |

From Table II it can be seen that the cement composition containing CMHEC-3 exhibited superior rheological properties.

EXAMPLE 3

Various lots of manufactured CMHEC having different moles of hydroxyethyl substitution and degrees of carboxymethyl substitution within the ranges of from about 0.62 to about 2.21 moles of hydroxyethyl substitution and from about 0.44 to about 0.52 degrees of carboxymethyl substitution were tested for rheological properties, fluid loss control, thickening times and compressive strengths. The results of these tests are shown in Tables III and IV below.

TABLE III

Comparison Of Various Lots Of CMHEC-3

| Lot No. | Amount Of Additive In Test Cement Slurry, % by wt of cement | 100° F. Howco Viscosity Int/20 min[1] | Fluid Loss, cc/30 min | Thickening Time, hr:min 165° F. | 190° F. | 220° F. | 24 Hour Compressive Strength Temp., °F. | psi |
|---|---|---|---|---|---|---|---|---|
| \multicolumn{9}{c}{Class H Cement Mixed at 15.6 lb/gal} |
| 10 | 0.2 | 6/6 | 267 @ 100° F. | 3:46 | | | 215 | 2780 |
| 11 | 0.2 | 6/6 | 219 @ 100° F. | 5:30 | | | 215 | 2980 |
| 12 | 0.2 | 5/5 | 189 @ 100° F. | 3:48 | | | 215 | 3350 |
| 13 | 0.2 | 5/5 | 177 @ 100° F. | 4:36 | | | 215 | 3350 |
| 14 | 0.2 | 5/5 | 178 @ 100° F. | 11:32 | | | 215 | 2540 |
| 10 | 0.4 | 9/9 | 56 @ 100° F. | | | 3:30 | 293 | 3180 |
| 11 | 0.4 | 7/7 | 78 @ 100° F. | | | 4:05 | 293 | 944 |
| 12 | 0.4 | 5/5 | 48 @ 100° F. | | | 3:15 | 293 | 900 |
| 13 | 0.4 | 6/5 | 48 @ 100° F. | | | 3:10 | 293 | 1011 |
| 14 | 0.4 | 5/5 | 46 @ 100° F. | | | 5:21 | 293 | Soft |
| 10 | 1.0 | 15/12 | 26 @ 190° F. | | 8:23 | | 318 | 742 |
| 11 | 1.0 | 18/17 | 28 @ 190° F. | | 9:09 | | 318 | 914 |
| 12 | 1.0 | 11/5 | 22 @ 190° F. | | 9:30 | | 318 | 1011 |
| 13 | 1.0 | 19/8 | 22 @ 190° F. | | 8:25 | | 318 | 915 |
| 14 | 1.0 | 15/10 | 22 @ 190° F. | | | | 318 | 900 |

[1]Int/20 means initial viscosity and viscosity after 20 minutes

TABLE IV

Comparison Of Various Lots Of CMHEC-3

| Lot No. | Amount Of Additive In Test Cement Slurry, % by wt of cement | Fann Viscometer Readings | | | | |
|---|---|---|---|---|---|---|
| | | 300 RPM | 200 RPM | 100 RPM | 6 RPM | 3 RPM |
| \multicolumn{7}{c}{Class H Cement Mixed at 15.6 lb/gal @ 80° F.} |
| 10 | 0.2 | 52 | 36 | 20 | 2 | 1 |
| 11 | 0.2 | 38 | 25 | 13 | 1 | 1 |
| 12 | 0.2 | 38 | 26 | 14 | 0 | 0 |
| 13 | 0.2 | 40 | 28 | 15 | 1 | 1 |
| 14 | 0.2 | 38 | 26 | 14 | 1 | 1 |
| 10 | 0.4 | 158 | 112 | 63 | 6 | 3 |
| 11 | 0.4 | 85 | 59 | 30 | 3 | 1 |
| 12 | 0.4 | 75 | 54 | 29 | 2 | 1 |
| 13 | 0.4 | 113 | 80 | 44 | 4 | 3 |
| 14 | 0.4 | 108 | 77 | 42 | 3 | 2 |
| \multicolumn{7}{c}{Class H Cement Mixed at 15.6 lb/gal @ 190° F.} |
| 10 | 1.0 | 300+ | 217 | 125 | 13 | 8 |
| 11 | 1.0 | 300+ | 300+ | 204 | 26 | 17 |
| 12 | 1.0 | 120 | 89 | 47 | 4 | 2 |
| 13 | 1.0 | 180 | 127 | 70 | 6 | 3 |
| 14 | 1.0 | 210 | 149 | 83 | 7 | 4 |
| \multicolumn{7}{c}{Class H Cement Mixed at 16.5 lb/gal @ 190° F.} |
| 11 | 1.0 | 300+ | 300+ | 300+ | 87 | 54 |
| 12 | 1.0 | 300+ | 300+ | 212 | 18 | 10 |
| 13 | 1.0 | 300+ | 300+ | 300+ | 34 | 18 |
| 14 | 1.0 | 300+ | 300+ | 300+ | 45 | 31 |

As shown in Tables III and IV, Lot 12 produced the best results which had 1.93 moles of hydroxyethyl substitution and 0.52 degrees of carboxymethyl substitution and a 2% by weight aqueous solution of the CMHEC had a viscosity of 55 mPa.s.

EXAMPLE 4

Two cement slurries comprised of Portland class H cement, 15% by weight of fumed silica and sufficient water to form slurries were prepared. Slurry 1 had a density of 15.9 pounds per gallon and Slurry 2 had a density of 16.23 pounds per gallon. To test samples of Slurry 1 and Slurry 2, the CMHEC additives described in Example 1 above, i.e,.

CMHEC-1, CMHEC-2 and CMHEC-3, were added in the amounts shown in Table V. The test slurries were then foamed with air to the densities given in Table V. The foamed cement samples were tested for compressive strengths at 24 hours and 48 hours and the foam stability density variation in set cores produced from the test samples were also tested. The test results are given in Table V below.

TABLE V

Foam Stability Tests
Slurry 1:
Class H Cement + 15% Silicalite; Base Density – 15.9 lb/gal
Slurry 2:
Class H Cement + 15% Silicalite + 35% SSA-1: Base Density – 16.23 lb/gal

| Slurry # Foamed Density lb/gal | Amount Of Additive in Test Cement Slurry, % by wt of cement | 190° F. Compressive Strength, psi | | Foam Stability Density Variation, lb/gal | | |
|---|---|---|---|---|---|---|
| | | 24 Hour | 48 Hour | Top | Middle | Bottom |
| 1 11.73 | 0.2 CMHEC-3 | 573 | 706 | 11.25 | 11.22 | 11.4 |
| 1 11.82 | 0.2 CMHEC-1 | 618 | 580 | 11.0 | 10.85 | 10.69 |
| 1 12.0 | 0.2 CMHEC-2 | 435 | 587 | 11.22 | 10.99 | 10.88 |
| 2 12.2 | 0.4 CMHEC-3 | 597 | 942 | 11.98 | 11.92 | 11.87 |
| 2 12.2 | 0.4 CMHEC-1 | 238 | 262 | 11.4 | 10.93 | 10.36 |
| 2 11.8 | 0.4 CMHEC-2 | 340 | 244 | 11.16 | 11.73 | 11.04 |

From Table V, it can be seen that the CMHEC additive of the present invention (CMHEC-3) had excellent compressive strength and the least density variation.

Thus, the present invention is well adapted to carry out the objects and attain the ends and advantages mentioned as well as those which are inherent therein. While numerous changes may be made by those skilled in the art, such changes are encompassed within the spirit of this invention as defined by the appended claims.

What is claimed is:

1. A method of cementing a subterranean zone comprising the steps of:
   (a) providing or preparing a cement composition comprised of a hydraulic cement, sufficient water to form a slurry, an additive for providing improved rheology, fluid loss control and set retardation to said cement composition comprised of carboxymethylhydroxyethyl cellulose (CMHEC) having in the range of from about 0.62 to about 2.21 moles of hydroxyethyl substitution and in the range of from about 0.44 to about 0.52 degrees of carboxymethyl substitution, and a 2% by weight aqueous solution of the CMHEC has a Höppler viscosity in the range of from about 55 mPa.s to about 359 mPa.s, and sufficient gas to foam said slurry;
   (b) placing said cement composition in said subterranean zone; and
   (c) allowing said cement composition to set into a solid mass therein.

2. The method of claim 1 wherein said CMHEC has about 1.93 moles of hydroxyethyl substitution and about 0.52 degrees of carboxymethyl substitution.

3. The method of claim 2 wherein a 2% by weight aqueous solution of said CMHEC has a Höppler viscosity of about 55 mPa.s.

4. The method of claim 1 wherein said CMHEC is present in said cement composition in an amount in the range of from about 0.1% to about 2.5% by weight of said hydraulic cement therein.

5. The method of claim 1 wherein said hydraulic cement in said composition is selected from the group consisting of Portland cements, slag cements, pozzolana cements, gypsum cements, aluminous cements and alkaline cements.

6. The method of claim 1 wherein said cement is Portland cement.

7. The method of claim 1 wherein said water is selected from the group consisting of fresh water and salt water.

8. The method of claim 1 wherein said water is present in said composition in an amount in the range of from about 35% to about 55% by weight of hydraulic cement therein.

9. The method of claim 1 wherein said gas is selected from the group consisting of air and nitrogen.

10. The method of claim 1 wherein said composition further comprises a sufficient amount of a foaming and foam stabilizing surfactant mixture to facilitate the formation of and stabilize said foam.

11. The method of claim 10 wherein said foaming and foam stabilizing surfactant mixture is comprised of an ethoxylated alcohol ether sulfate present in said mixture in an amount of about 63.3 parts by weight, cocoylamidopropylbetaine present in said mixture in an amount of about 31.7 parts by weight and cocoylamidopropyldimethyl amine oxide present in said mixture in an amount of about 5 parts by weight.

12. The method of claim 10 wherein said foaming and foam stabilizing surfactant mixture is present in said composition in an amount in the range of from about 0.8% to about 2% by volume of water therein.

13. A method of cementing a subterranean zone comprising the steps of:
   (a) providing or preparing a foamed cement composition comprised of Portland cement, sufficient water to form a slurry, an additive for providing improved rheology, fluid loss control and set retardation to said cement composition comprised of carboxymethylhydroxyethyl cellulose (CMHEC) having in the range of from about 0.62 to about 2.21 moles of hydroxyethyl substitution and in the range of from about 0.44 to about 0.52 degrees of carboxymethyl substitution and a 2% by weight aqueous solution of said CMHEC has a Höppler viscosity in the range of from about 55 mPa.s to about 359 mPa.s, sufficient gas to foam said slurry and a sufficient amount of a foaming and foam stabilizing surfactant mixture to facilitate the formation of and stabilize said foam;
   (b) placing said cement composition in said subterranean zone; and
   (c) allowing said cement composition to set into a solid mass therein.

14. The method of claim 13 wherein said CMHEC has about 1.93 moles of hydroxyethyl substitution and about 0.52 moles of carboxymethyl substitution and a 2% by weight aqueous solution of said CMHEC has a Höppler viscosity of about 55 mPa.s.

15. The method of claim 13, wherein said CMHEC is present in said cement composition in an amount in the range of from about 0.1% to about 2.5% by weight of said hydraulic cement therein.

16. The method of claim 13 wherein said water is selected from the group consisting of fresh water and salt water.

17. The method of claim 13 wherein said gas is nitrogen.

18. The method of claim 13 wherein said foaming and foam stabilizing surfactant mixture is comprised of an ethoxylated alcohol ether sulfate present in said mixture in an amount of about 63.3 parts by weight, cocoylamidopropyl betaine present in said mixture in an amount of about 31.7 parts by weight and cocoylamidopropyl dimethyl amine oxide present in said mixture in an amount of about 5 parts by weight.

* * * * *